United States Patent [19]

O'Hara et al.

[11] 4,447,556

[45] May 8, 1984

[54] HYDROCARBON CONVERSION CATALYST AND USE THEREOF

[75] Inventors: Mark J. O'Hara, Mt. Prospect; Russell W. Johnson, Villa Park, both of Ill.

[73] Assignee: UOP Inc., Des Plaines, Ill.

[21] Appl. No.: 481,969

[22] Filed: Apr. 4, 1983

[51] Int. Cl.³ .................... B01J 21/12; B01J 29/14
[52] U.S. Cl. ...................... 502/74; 502/314; 502/315; 208/216 R; 208/254 H; 208/111; 208/143
[58] Field of Search .................. 502/74, 313, 314, 315

[56] References Cited

U.S. PATENT DOCUMENTS

| | | | |
|---|---|---|---|
| 2,746,936 | 5/1956 | Plank | 252/465 |
| 3,184,404 | 5/1965 | Flinn et al. | 208/112 |
| 3,269,958 | 8/1966 | Gatsis | 252/439 |
| 3,361,682 | 1/1968 | Keith et al. | 252/464 |
| 3,554,900 | 1/1971 | Bowes | 252/455 Z |
| 3,577,353 | 5/1971 | White | 252/465 |
| 3,789,025 | 1/1974 | Tauster | 252/465 |
| 3,931,048 | 1/1976 | Hilfman | 252/455 R |
| 3,956,104 | 5/1976 | Hilfman et al. | 208/111 |

*Primary Examiner*—Delbert E. Gantz
*Assistant Examiner*—O. Chaudhuri
*Attorney, Agent, or Firm*—James R. Hoatson, Jr.; John G. Cutts, Jr.; William H. Page, II

[57] ABSTRACT

A hydrocarbon conversion catalyst is disclosed which comprises a combination of a carrier material, a Group VIB metal component and Group VIII metal component wherein said group VIB metal component and said Group VIII metal component are incorporated in said catalytic composite by means of a non-aqueous organic solution of a Group VIB metal compound and a Group VIII metal compound, wherein said non-aqueous organic solution comprises dimethylformamide, formamide, diethylformamide, ethylformamide, methylformamide, pyridine, aniline or toluene and wherein said catalytic composite is calcined in a non-oxidizing atmosphere. Other embodiments of the present invention describe the use of the catalyst for hydrocarbon conversion and preferred methods of catalyst manufacture.

12 Claims, No Drawings

HYDROCARBON CONVERSION CATALYST AND USE THEREOF

BACKGROUND OF THE INVENTION

1. Field of the Invention

The field of art to which this invention pertains is the catalytic conversion of hydrocarbons. This invention also relates to hydrocarbon conversion catalysts and their method of manufacture. The catalyst composite of the present invention demonstrates unexpected and exceptional activity, selectivity and resistance to deactivation when employed in a hydrocarbon conversion process. More particularly, the invention relates to a catalyst which is useful for performing the hydrocracking of hydrocarbons.

2. Description of the Prior Art

The hydrocracking of hydrocarbons by catalytic means is old and well-known in the prior art. Hydrocracking of hydrocarbon oil, which may be high-boiling fractions, such as for example reduced crudes, gas oils, topped crudes, shale oil, coal extract and tar sand extract, generally is performed at relatively high temperatures and pressures of the order of 500° F. and 500 psig and upward. Catalysts for the hydrocracking of hydrocarbons are generally moderate to strong hydrogenation catalysts.

The prior art hydrocracking catalysts will typically comprise one or more components selected from silica, alumina, silica-alumina, crystalline aluminosilicate, or other refractory inorganic oxide and at least one metal component from Group VIB or Group VIII. Hydrocracking catalysts containing alumina and a crystalline aluminosilicate, as well as alumina and silica, have been shown to be particularly effective in the hydrocarbon hydrocracking process. One or more hydrogenation components have been selected to the prior art to serve as the hydrogenation component in hydroconversion catalysts. The prior art has broadly taught that hydrogenation components may be selected from at least the following metals: iron, cobalt, nickel, ruthenium, rhodium, palladium, osmium, iridium, platinum, chromium, molybdenum, tungsten, vanadium, niobium and tantalum. The prior art has also taught that a preferred component of hydrocracking catalyst is a crystalline aluminosilicate (CAS) and may be selected from at least the following crystalline aluminosilicates: X zeolite, Y zeolite, mordenite, etc. Other preferred components of hydrocracking catalyst are amorphous silica and alumina, amorphous silica-alumina and cogelled silica-alumina.

In U.S. Pat. No. 3,956,104 (Hilfman et al), a preferred hydrocracking catalyst contained molybdenum and nickel. In U.S. Pat. No. 3,931,048 (Hilfman et al), a preferred hydrocracking catalyst comprises nickel, tungsten and a silica-alumina carrier material. U.S. Pat. No. 3,184,404, (Flinn et al) teaches the combination of tungsten and a metal selected from Group VIII of the Periodic Table of the Elements on an alumina support as an effective hydrocracking catalyst. The hereinabove mentioned patents relate to hydrocracking catalysts which are associated with refractory inorganic oxide support materials and which patents provide examples of some of the prior art catalysts.

It is generally recognized that catalysis is a mechanism particularly noted for its unpredictable nature. Minor variations in a method of manufacture often result in an unexpected improvement in the catalyst product with respect to a given hydrocarbon conversion reaction. The improvement may be the result of an undetermined alteration in the physical character and/or composition of the catalyst product difficult to define and apparent only as a result of the unexpected improvement in the catalyst activity, selectivity and/or stability.

One of the discoveries of the present invention is a novel catalyst which exhibits improved and unexpected hydrocarbon conversion characteristics, such as, activity and selectivity, and extraordinary stability. The present invention also describes the utilization of the novel catalyst in a hydrocarbon conversion process. Another embodiment of the present invention describes methods for preparing catalysts.

SUMMARY OF THE INVENTION

Accordingly, the invention is, in one embodiment, a catalytic composite which comprises a combination of a carrier material, a Group VIB metal component and Group VIII metal component wherein the Group VIB metal component and the Group VIII metal component are incorporated in the catalytic composite by means of a non-aqueous organic solution of a Group VIB metal compound and a Group VIII metal compound, wherein the non-aqueous organic solution comprises dimethylformamide, formamide, diethylformamide, ethylformamide, methylformamide, pyridine, aniline or toluene and wherein the catalytic composite is calcined in a non-oxidizing atmosphere.

In a second embodiment, the invention is a process for the conversion of a hydrocarbon charge stock which comprises reacting the charge stock with hydrogen at hydrocarbon conversion conditions in contact with a catalytic composite comprising a combination of a carrier material, a Group VIB metal component and Group VIII metal component and wherein the Group VIB metal component and the Group VIII metal component are incorporated in the catalytic composite by means of a non-aqueous organic solution of a Group VIB metal compound and a Group VIII metal compound, wherein the non-aqueous organic solution comprises dimethylformamide, formamide, diethylformamide, ethylformamide, methylformamide, pyridine, aniline or toluene and wherein the catalytic composite is calcined in a non-oxidizing atmosphere.

In a third embodiment, the invention is a method for the preparation of catalysts, comprising a combination of a carrier material, a Group VIB metal component and Group VIII metal component wherein the Group VIB metal component and the Group VIII metal component are incorporated in the catalytic composite by means of a non-aqueous organic solution of a Group VIB metal compound and Group VIII metal compound, wherein the non-aqueous organic solution comprises dimethylformamide, formamide, diethylformamide, ethylformamide, methylformamide, pyridine, aniline or toluene and wherein the catalytic composite in calcined in a non-oxidizing atmosphere.

Other embodiments of the present invention encompass further details such as specific component concentrations of the catalytic composite, methods of preparation, preferred feedstocks and hydrocarbon conversion conditions, all of which are hereinafter disclosed in the following discussion of each of these facets of the invention.

DETAILED DESCRIPTION OF THE INVENTION

The hydrocarbon charge stock subject to hydroconversion in accordance with the process of this invention is suitably a petroleum fraction boiling in the range from about 200° F. to about 1200° F. Pursuant to the present process, the hydrocarbon charge stock is reacted with hydrogen at hydroconversion conditions which may include a hydrogen pressure from about 500 psig to about 3000 psig and a temperature from about 500° F. to about 900° F.

Petroleum hydrocarbon fractions which can be utilized as charge stocks thus include the gas oils, fuel oils, kerosene, etc., recovered as distillate in the atmospheric distillation of crude oils, also the light and heavy vacuum gas oils resulting from the vacuum distillation of the reduced crude, the light and heavy cycle oils recovered from the catalytic cracking process, light and heavy coker gas oils resulting from low pressure coking, coal tar distillates and the like. Residual oils, often referred to as asphaltum oil, liquid asphalt, black oil, residuum, etc., obtained as liquid or semi-liquid residues after the atmospheric or vacuum distillation of crude oils, are operable in this process although it may be desirable to blend such oils with lower boiling petroleum hydrocarbon fractions for economical operation. The petroleum hydrocarbon charge stock may boil substantially continuously between about 200° F. to about 1200° F. or it may consist of any one, or a number of petroleum hydrocarbon fractions, such as are set out above, which distill over within the 200°–1200° range. Suitable hydrocarbon feedstocks also include hydrocarbons derived from tar sand, oil shale and coal.

Since the petroleum hydrocarbons and other hydrocarbons as well which are hydroprocessed according to the process of this invention boil over a considerably wide range, it may be readily perceived that suitable reaction temperatures will lie within a correspondingly wide range, the preferred temperature ranges depending in each instance upon the particular petroleum hydrocarbon fraction utilized as a charge stock. For example, reaction temperatures from about 500° F. to about 1000° F. are generally operable. However, where the particular petroleum hydrocarbon fraction utilized boils within the range from about 700° F. to about 900° F., it is preferred to operate at reaction temperatures in the more restricted range from about 500° F. to about 900° F. Hydrocarbon conversion processes which are contemplated for the present invention may include for example desulfurization, denitrification, hydrogenation, hydrocracking, etc.

Pursuant to the present invention and as hereinabove mentioned, hydrogen is reacted with the hydrocarbon charge stock preferably at a pressure of from about 500 psig to about 3000 psig. The hydrogen circulation rate is preferably from about 500 standard cubic feet to about 20,000 standard cubic feet per barrel of charge stock, although amounts of from about 200 standard cubic feet to as much as 30,000 standard cubic feet per barrel are operable. The liquid hourly space velocity of the petroleum hydrocarbon charge stock is preferably from about 0.2 to about 10 depending on the particular charge employed and the reaction temperatures necessitated thereby. A suitable correlation between space velocity and reaction temperature can be readily determined by one skilled in the art in any particular instance. When utilizing a charge stock boiling in the range of from about 700° to about 900° F., a liquid hourly space velocity of from about 1 to about 3 is preferred.

The carrier material of the present invention may comprise any suitable refractory inorganic oxide or mixtures thereof. For example, the carrier material may comprise alumina, silica, crystalline aluminosilicates or mixtures thereof. A preferred carrier material is a co-gelled silica-alumina. A suitable refractory inorganic oxide is alumina. The alumina may be any of the various hydrous aluminum oxides or alumina gels such as alpha-alumina monohydrate of the boehmite structure, alpha-alumina trihydrate of the gibbsite structure, beta-alumina trihydrate of the bayerite structure, and the like. A particularly preferred alumina is referred to as Ziegler alumina and has been characterized in U.S. Pat. Nos. 3,852,190 and 4,012,313 as a by-product from a Ziegler higher alcohol synthesis reaction as described in Ziegler's U.S. Pat. No. 2,892,858. For purposes of simplification, the name "Zielger alumina" is used herein to identify this material. It is presently available from the Conoco Chemical Division of Continental Oil Company under the trademark Catapal. This material is an extremely high purity alpha-alumina monohydrate (boehmite) which after calcination at a high temperature has been shown to yield a high purity gamma-alumina.

One of the preferred carrier materials is a silica-alumina carrier material and may be prepared in any convenient manner known in the prior art. However, according to a preferred method of the present invention, the silica-alumina carrier material is co-gelled. The co-gelled silica-alumina may be prepared and utilized as spheres, pills, pellets, extrudates, granules, etc. In a preferred method of manufacture, an aqueous water glass solution, diluted to a silica concentration of from about 5 to about 15 wt.%, is acidified with hydrochloric acid or other suitable mineral acid. The resulting sol is acid aged at a pH of from about 4 to about 4.8 to form a hydrogel, and the hydrogel is further used at a pH of from about 6.5 to about 7.5 The silica hydrogel is then thoroughly admixed with an aqueous aluminum salt solution of sufficient concentration to provide a desirable alumina content in the silica-alumina product. The silica-alumina sol is then precipitated at a pH of about 8 by the addition of a basic precipitating agent, suitably aqueous ammonium hydroxide. The silica-alumina, which exists as a hydrogel slurried in a mother liquor, is recovered by filtration, water-washed and dried at a temperature of from about 200° to about 500° F. Drying is preferably by spray-drying techniques whereby the co-gelled silica-alumina is recovered as microspheres, admixed with a suitable binding agent such as graphite, polyvinyl alcohol, etc., and extruded or otherwise compressed into pills or pellets or any other uniform size and shape. A particularly preferred method for preparing the co-gelled silica-alumina support is by the well-known oil drop method which permits the utilization of the support or carrier material in the form of macrospheres. For example, an alumina sol, utilized as an alumina source, is commingled with an acidified water glass solution as a silica source, and the mixture further commingled with a suitable gelling agent, for example urea, hexamethylenetetramine, or mixtures thereof. The mixture is discharged while still below gelation temperature, and by means of a nozzle or rotating disc, into a hot oil bath maintained at gelation temperature. The mixture is dispersed into the oil bath as droplets which form into spheroidal gel particles during passage therethrough. The aluminum sol is preferably prepared by a method wherein aluminum pellets are commingled with a quantity of treated or deionized water, with hydrochloric acid added thereto in a sufficient amount to digest a portion of the aluminum metal and form the desired sol. A suitable reaction rate is effected at about reflux temperature of the mixture. The spheroidal gel particles prepared by the oil drop method are aged, usually in the oil bath, for a period of at least 10-16 hours, and then in a suitable alkaline or basic medium for at least 3 to about 10 hours, and finally water washed. Proper gelation of the mixture in the oil bath, as well as subsequent aging of the gel spheres, is not readily accomplished below about 120° F., and at about 210° F., the rapid evolution of the gases tend to rupture and otherwise weaken the spheres. By maintaining sufficient superatmospheric pressure during the forming and aging steps in order to maintain water in the liquid phase, a higher temperature can be employed, frequently with improved results. If the gel particles are aged at superatmospheric pressure, no alkaline aging step is required. The spheres are water-washed, preferably with water containing a small amount of ammonium hydroxide and/or ammonium nitrate. After washing, the spheres are dried, at a temperature from about 200° to about 600° F. for a period of from about 6 to about 24 hours or more, and then calcined at a temperature from about 800° to about 1400° F. for a period from about 2 to about 12 hours or more. A preferred silica-alumina carrier material contains from about 20 weight percent to about 80 weight percent silica. Another suitable refractory inorganic oxide is a crystalline aluminosilicate. Any suitable crystalline aluminosilicates may be employed and such suitable candidates may include the natural zeolites faujasite, mordenite, erionite and chabazite and synthetic zeolites, A, L, S, T, X and Y. In general, these zeolites are metal aluminosilicates having a crystalline structure such that a relatively large adsorption area is present inside each crystal. Zeolites consist basically of three-dimensional frameworks of SiO4 and AlO4 tetrahedra with the tetrahedra crosslinked by the sharing of oxygen atoms. The electrovalence of the tetrahedra containing aluminum is balanced by the inclusion of cations in the crystal, for example, metal ions, ammonium ions, amine complexes, or hydrogen ions. The spaces in the pores may be occupied by water or other adsorbate molecules. Normally, the crystalline zeolites occur, or are prepared, in the sodium or potassium form. The zeolites presently preferred for application within the concept of this invention are those having relatively large pore sizes, i.e., 5 Angstroms or greater, generally characterized as being sufficient to admit hydrocarbon molecules or portions thereof to and from the interior of the zeolite. Illustration of zeolites within this class are zeolites L, T, X, Y, mordenite and the like. The desirability of employing larger size zeolites derives from the improved product distributions which result from their use, particularly in hydrocracking applications. Understandably the larger pore openings facilitate the migration of larger hydrocarbon molecules into the zeolite.

In the event a carrier material containing alumina and crystalline aluminosilicate or zeolite is desired, the zeolite may be composited with the alumina in any convenient method known in the prior art. For example, one method for preparing the catalyst composition is by mixing the finely divided zeolite into an alumina sol, gelling the sol by addition of dilute ammonia to produce a gel which is then dried and pelleted. Spherical catalyst particles can be formed, for example, by dropping the admixture of finely divided zeolite and alumina sol together with a gelling agent into an oil bath to form spherical particles of an alumina gel containing zeolite. The zeolite and alumina can also be formed in any other desired shape or type of catalyst known to those skilled in the art such as rods, pills, pellets, tablets, granules, extrudates and the like forms.

In accordance with another embodiment of the present invention, further details of the catalyst, its specific concentrations and methods of preparation are hereinafter discussed. As is customary in the art of catalysis, when referring to the catalytically active metal, or metals, it is intended to encompass the existance of such metal in the elemental state or in some form such as an oxide, sulfide, halide, etc. Regardless of the state in which the metallic component actually exists, the concentrations are computed as if they existed in the elemental state.

Other essential ingredients are a Group VIB metal component and a Group VIII metal component. Thus, the catalytic composite of the present invention may contain metallic components from the group of molybdenum, tungsten, chromium, iron, cobalt, nickel, platinum, palladium, iridium, osmium, rhodium, ruthenium and mixtures thereof. The concentration of the catalytically active metallic components is primarily dependent upon the particular metals as well as the physical and chemical characteristics of the charge stock. For example, the metallic components from Group VI-B are preferably present in an amount within the range from about 0.01 percent to about 20 percent by weight, and the Group VIII metals in an amount within the range from about 0.01 percent to about 10 percent by weight, all of which are calculated as if the metallic component existed within the finished catalytic composite as the elemental metal. Preferred Group VIB metal components include molybdenum, tungsten and compounds thereof. Preferred Group VIII metal components include cobalt, nickel and compounds thereof.

Regardless of which carrier material is selected and composited, the carrier material is preferably dried at a temperature from about 200° F. to about 600° F. for a period from about 1 to about 24 hours or more and finally calcined at a temperature from about 700° F. to about 1400° F. for a period from about 0.5 to about 10 hours. The calcined carrier material is then combined in accordance with the present invention with a Group VIB metal component and a Group VIII metal component. The Group VIB metal component and the Group VIII metal component may be incorporated with the selected carrier material in a sequential manner but it is preferred that the Group VIB metal component and the Group VIII metal component be incorporated simultaneously. Accordingly, a soluble compound of the desired Group VIB metal and Group VIII metal is dissolved in an organic compound selected from dimethylformamide, formamide, diethylformamide, ethylformamide, methylformamide, pyridine, analine or toluene to provide a non-aqueous organic solution. The carrier material may, for example, be soaked, dipped, suspended, or otherwise immersed in a non-aqueous organic solution containing a Group VIB metal component and a Group VIII metal component. After the metal components have been incorporated with the carrier material, the metal containing carrier material is dried at a temperature from about 200° F. to about 500° F. for a period of time from about 1 to about 10 hours. The dried carrier material is then calcined in a non-oxidizing atmosphere at a temperature from about 700° F. to about 1300° F. or more. The non-oxidizing atmosphere may comprise nitrogen, argon, carbon dioxide, hydrogen, carbon monoxide or combinations thereof. The order in which the Group VIB metal component or the Group VIII metal component is composited with the carrier material is not critical to the present invention. The carrier material is preferably dried and calcined in a non-oxidizing atmosphere after each metal component has been added to the carrier material. In the event that the Group VIB metal component is to be composited before the Group VIII metal component, the carrier material containing the Group VIB metal component is dried and calcined in a non-oxidizing atmosphere before the incorporation of the Group VIII metal component. In the event of co-incorporation of a Group VIB metal component and a Group VIII metal component from a non-aqueous organic solution thereof, a single calcination is sufficient.

Without wishing to be bound by a theory, it is believed that the incorporation of the carrier material with a Group VIB metal component and a Group VIII metal component from a non-aqueous organic solution thereof as hereinabove described and the subsequent calcination in a non-oxidizing atmosphere permits a homogeneous deposition of the metal components throughout the catalyst particle while at the same time promoting a favorable interaction of the metal moieties with each other and with the carrier material while inhibiting metal crystalline agglomeration and all of which is believed to contribute to the superior performance of the finished catalyst composite.

It is preferred that the resultant calcined catalytic composite be subjected to reduction conditions prior to its use in the conversion of hydrocarbons. Preferably, substantially pure and dry hydrogen is used as the reducing agent in this step. The reducing agent is contacted with the calcined catalyst at a temperature of about 500° F. to about 1200° F. and for a period of time of about 0.5 to about 10 hours or more. Catalyst reduction may be performed in the conversion reactor during the start-up procedure or with the reducing atmosphere of the actual process conditions. Although it is not essential, the resulting reduced catalyst is preferably subjected to a presulfiding operation designed to incorporate in the catalytic composite from about 0.05 to about 10 weight percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of the sulfur component, generally including a temperature ranging from about 50° F. to about 1100° F. or more. Catalyst sulfiding may be performed in the conversion reactor during the start-up procedure by passing sulfur-containing feedstock over the catalyst at sulfiding temperature.

The conditions utilized in the numerous hydrocarbon conversion embodiments of the present invention are those customarily used in the art for the particular reaction, or combination of reactions, that is to be effected. The catalyst of the present invention is suitable for hydrocarbon conversion processes which may include alkylaromatic isomerization, paraffin isomerization, olefin isomerization, alkylation, denitrification, desulfurization, hydrogenation and hydrocracking.

The following example is given to illustrate further the preparation of the catalytic composite of the present invention and the use thereof in the conversion of hydrocarbons. The example is not to be construed as an undue limitation on the generally broad scope of the invention as set out in the appended claims and is therefore intended to be illustrative rather than restrictive.

EXAMPLE

A batch of co-gelled silica-alumina carrier material containing 50% silica and 50% alumina was prepared by the hereinabove described oil-drop method. The ratio of silica and alumina sources was selected to yield a 50/50 mixture of silica and alumina. The finished co-gelled silica-alumina support material was in the form of 1/16 inch spheres and had an apparent bulk density of about 0.6 A first portion of the hereinabove described co-gelled silica-alumina carrier material was impregnated with an aqueous solution of nickel nitrate and ammonium metatungstate. The impregnated spheres were dried and then oxidized in air (calcined) at a temperature of 1100° F. The concentration of nickel nitrate and ammonium metatungstate was selected to yield a finished catalyst which contained 0.6 weight percent nickel and 6 weight percent tungsten. This batch of finished catalyst is representative of a commercial hydrocracking and the prior art catalysts in general, and will hereinafter be referred to as Catalyst A.

A second portion of the hereinabove described co-gelled silica-alumina carrier material was impregnated with a non-aqueous dimethylformamide solution of nickel nitrate and ammonium metatungstate. The impregnated spheres were dried and then calcined in a nitrogen atmosphere at 1100° F. Although the target nickel level was 0.6 weight percent and the tungsten level was 6.0 weight percent, and the impregnation solution was prepared accordingly, an assay of the finished catalyst showed a nickel level of 0.67 weight percent and a tungsten level of 5.7 weight percent. It is believed that the slight shift in nickel and tungsten levels from the target levels would not materially change the performance characteristics of the resulting catalyst nor would the shift explain the surprising and unexpected results of the catalyst of the present invention. This latter batch of finished catalyst was prepared in accordance with the present invention and is hereinafter referred to as Catalyst B.

In order to demonstrate the extraordinary characteristics of the catalyst of the present invention, both Catalyst A and Catalyst B were separately tested in a small scale hydrocracking pilot plant. The feedstock selected for these tests was a vacuum gas oil having the properties presented in Table I.

TABLE I

| Vacuum Gas Oil Feedstock Properties | |
|---|---|
| Gravity, °API at 60° F. | 21.6 |
| Distillation, % over °F. | |
| 5 | 571 |
| 10 | 619 |
| 20 | 668 |
| 30 | 705 |
| 40 | 733 |

TABLE I-continued

| Vacuum Gas Oil Feedstock Properties | |
|---|---|
| 50 | 758 |
| 60 | 780 |
| 70 | 805 |
| 80 | 840 |
| 90 | 886 |
| E.P. | 959 |
| Sulfur, weight % | 3.0 |
| Nitrogen, weight % | 0.12 |
| Hydrogen, weight % | 12.4 |
| Heptane Insoluble, weight % | 0.06 |
| Pour Point, °F. | +65 |

Both of these tests were conducted at conditions which included a liquid hourly space velocity of 1.0, a pressure of 2000 psig and a recycle gas rate of 12,000 SCFB.

The prior art catalyst, Catalyst A, was installed in the pilot plant and the vacuum gas oil was charged to the catalyst. The vacuum gas oil was substantially converted to products having a boiling point less than 650° F. The level of catalyst activity of Catalyst A as determined by its ability to convert vacuum gas oil was determined during the course of the test in accordance with the standard test procedure and this activity was arbitrarily assigned an activity of 100.

A sample of the catalyst of the present invention, Catalyst B, was installed in the pilot plant and the vacuum gas oil was charged to the catalyst in essentially the same manner as in the Catalyst A test. The vacuum gas oil was converted to products having a boiling point less than 650° F. in accordance with the standard test procedure. Accordingly, the activity of Catalyst B was found to be 120. These tests demonstrate that the catalyst of the present invention, Catalyst B, achieves superior hydrocracking activity. The experimental results are summarized in Table II.

TABLE II

| Summary of Results | |
|---|---|
| Catalyst | Relative Activity |
| Reference Catalyst A | 100 |
| Catalyst B | 120 |

This summary clearly demonstrates surprising and unexpected results caused by the incorporation of nickel and tungsten with a non-aqueous solution of dimethylformamide together with a final calcination in a non-oxidizing atmosphere. These results show that Catalyst B is 20% more active than the prior art reference catalyst, Catalyst A, for the conversion of vacuum gas oil to lower boiling hydrocarbon products.

The foregoing description and example clearly illustrate the improvements encompassed by the present invention and the benefits to be afforded with the use of the catalyst of the present invention.

We claim as our invention:

1. A catalytic composite comprising a combination of a carrier material, a Group VIB metal component and Group VIII metal component wherein said Group VIB metal component and said Group VIII metal component are incorporated in said catalytic composite by means of a non-aqueous organic solution of a Group VIB metal compound and a Group VIII metal compound, wherein said non-aqueous organic solution comprises dimethylformamide, formamide, diethylformamide, ethylformamide, methylformamide, pyridine, aniline or toluene and wherein said catalytic composite is calcined in a non-oxidizing atmosphere.

2. The catalytic composite of claim 1 wherein said organic solution comprises dimethylformamide.

3. The catalytic composite of claim 1 wherein said carrier material comprises silica and alumina.

4. The catalytic composite of claim 2 wherein said carrier material is co-gelled silica-alumina.

5. The catalytic composite of claim 1 wherein said carrier material comprises crystalline aluminosilicate.

6. The catalytic composite of claim 1 wherein said Group VIB metal component is tungsten or a compound thereof.

7. The catalytic composite of claim 1 wherein said Group VIII metal component is nickel or a compound thereof.

8. The catalytic composite of claim 1 wherein said catalytic composite comprises from about 0.01 to about 20 weight percent Group VIB metal and from about 0.01 to about 10 weight percent Group VIII metal.

9. The catalytic composite of claim 1 wherein said non-oxidizing atmosphere comprises nitrogen, argon, carbon dioxide, hydrogen, carbon monoxide or combinations thereof.

10. A method for preparation of catalytic composites comprising a combination of a carrier material, a Group VIB metal component and Group VIII metal component wherein said Group VIB metal component and said Group VIII metal component are incorporated in said catalytic composite by means of a non-aqueous organic solution of a Group VIB metal compound and Group VIII metal compound, wherein said non-aqueous organic solution comprises dimethylformamide, formamide, diethylformamide, ethylformamide, methylformamide, pyridine, aniline or toluene and wherein said catalytic composite is calcined in a non-oxidizing atmosphere.

11. The method of claim 10 wherein said catalytic composite comprises from about 0.01 to about 20 weight percent Group VIB metal and from about 0.01 to about 10 weight percent Group VIII metal.

12. The method of claim 10 wherein said non-oxidizing atmosphere comprises nitrogen, argon, carbon dioxide, hydrogen, carbon monoxide or combinations thereof.

* * * * *